United States Patent [19]

Fleet et al.

[11] Patent Number: 5,104,665

[45] Date of Patent: Apr. 14, 1992

[54] MALOLACTIC FERMENTATION OF WINE

[75] Inventors: Graham H. Fleet, Sydney; Peter J. Costello, Parkside, both of Australia

[73] Assignee: Unisearch Limited, Kensington, Australia

[21] Appl. No.: 655,277

[22] Filed: Feb. 14, 1991

Related U.S. Application Data

[63] Continuation of Ser. No. 306,668, Feb. 6, 1989, abandoned.

[30] Foreign Application Priority Data

Feb. 5, 1988 [AU] Australia ............................ PI6613

[51] Int. Cl.$^5$ ................................................ C12G 1/00
[52] U.S. Cl. ........................................ 426/15; 426/592; 426/51; 426/52; 426/11
[58] Field of Search ............... 426/15, 11, 51, 52, 426/592

[56] References Cited

U.S. PATENT DOCUMENTS 4,380,552  4/1983  Grestrelius et al. ................. 426/52

OTHER PUBLICATIONS

King Developments in Industrial Micro. 26: 311-21 (1984).
McCord et al.; Am. J. Enol. Vitic., vol. 36, No. 3 (1985).
Davis et al., Am. J. Enol. Vitic., vol. 36, No. 4 (±985).
Beelman in Symposium Proceedings, Grape and Wine Centennial, University of California, Davis Webb, A. P. ed.
Beelman et al., in Malolactic Fermentatin, ed. Lee, T. H. (1984), The Australian Wine Res. Inst., Australia.
Wibowo et al., Am. J. Enol. Vitic., vol. 36, No. 4 (1985).
Kerr Australian Grape Grower and Winemaker, 1986, No. 268: 89-90.
Rossie et al., Am. J. Enol. Vitic., vol. 35, No. 2 (1984).
Crapisi et al., J. Applied Bacteriology (1987) 63: 513-521.
Spettoli et al., (1982), Am. J. Enol. Vitic., vol. 33, No. 1.
Spettoli et al., (1987), Annals New York Acad. Sci. (1987), pp. 386-389.
Spettoli et al., (1984), Annals New York Acad. Sci. (1984), pp. 461-464.
Crapisi et al., (1987), Am. J. Enol. Vitic., vol. 38, No. 4.

*Primary Examiner*—Joseph Golian
*Attorney, Agent, or Firm*—Fleit, Jacobson, Cohn, Price, Holman & Stern

[57] ABSTRACT

A process and equipment for the controlled malolactic fermentation of wine in which wine is introduced into a reaction vessel containing a concentration of at least $10^8$ cfu/ml of a bacterial or yeast species that is capable of converting malic acid to lactic acid through a bacteria retaining filter. The wine is removed from the reaction vessel through a bacteria retaining filter after a predetermined residence time in the reaction vessel sufficient to allow the desired malolactic fermentation to take place. The process and equipment are preferably operated on a continuous basis. The cells may be immobilized within the reaction vessel.

13 Claims, 8 Drawing Sheets

MALOLACTIC FERMENTATION OF WINE

This is a continuation of application Ser. No. 07/306,668, filed Feb. 6, 1989 which in turn is now abandoned.

TECHNICAL FIELD

The present invention relates to a process and equipment for the controlled malolactic fermentation of wine.

The malolactic fermentation is a key step in the overall process of making most red wines and now many white wines. Traditionally, it has occurred naturally in the wines through the growth of bacterial species or yeast such as *Leuconostoc oenos*. Failures in the onset and completion of malolactic fermentation inconveniently delays the overall process of vinification and necessitates lengthy storage of large volumes of wines which ultimately holds up bottling and packaging.

BACKGROUND ART

There is little doubt that the majority of wines significantly benefit from the malolactic fermentation, through a reduction in acidity and the development of subtle flavors that contribute to the complexity of sensory quality. Moreover, the vast majority of wine makers will not bottle their wines, particularly their red wines, until this reaction has been completed because the risk of this fermentation occurring naturally in the bottle is too great and, in that circumstance, the wine would be ruined. For these reasons, the vast majority of wine makers in Australia and other countries prefer to have all of their red wines and, now many of their white wines undergo malolactic fermentation prior to bottling.

Many wine makers still rely on the traditional method of naturally occurring malolactic fermentation, as a consequence of the growth of lactic acid bacteria (principally *Leuconostoc oenos*) indigenous in the wine. The unpredictability of this natural development has been a major worry to the wine maker. In some circumstances, the reaction would occur within 2-4 weeks after alcoholic fermentation whereas in others it might not occur for several weeks, months or not at all. When it does occur 2-4 weeks are generally required for bacteria to grow and complete the fermentation. Failure of the reaction to occur, delays further processing of the wine and is a substantial inconvenience to wine making. Because of this, there has been a strong move by wine makers in recent years to purposely encourage or induce the development of the malolactic fermentation by inoculating cultures of *Leuconostoc oenos* into the wine. Such cultures are either purchased commercially or prepared in large volume by the wine maker. In large wineries, it becomes expensive to purchase sufficient volumes of culture so that further cultivation of suitable organisms is often necessary to generate the quantity of biomass needed for inoculation into the wine.

Although inoculation substantially increases the probability the malolactic fermentation will occur, there is still an element of unpredictability and there is no 100% guarantee that the fermentation will occur. This is because the inoculated species must grow in the wine to conduct the fermentation and in some circumstances, the conditions of the wine are not supportive of this growth.

Wine industry trends towards induction of malolactic fermentation using inoculated fermentations have been restricted because the following problems still remain with this technique:

1) purchasing a large scale production of *Leuconostoc oenos* or other suitable biomass is expensive and demanding of winery resources;
2) fermentation relies upon growth of the inoculated cells, at best this is slow, requiring 2-4 weeks for a completed reaction and in some circumstances it might not occur at all giving no malolactic fermentation.

It is known that high concentrations of from $10^6$ to $10^8$ cells per ml of cells of *Leuconostoc oenos* or other suitable bacteria will rapidly convert malic acid to lactic acid in wine without the need for cell growth. The reaction occurs in a matter of minutes.

Under these conditions, the cells of *Leuconostoc oenos* act as a biocatalyst. Attempts have been made towards the development of technology for the rapid, continuous malolactic fermentation of wine. In these previous cases, the high cell concentrations of *Leuconostoc oenos* were attached to a solid support and the wine passed continuously over this support. While the desired objective (the rapid degradation of malic acid to lactic acid) was achieved, these technologies were never commercially developed. This is due to problems associated with microbial contamination of the reactors, transfer of flavor taints to the wine, loss of activity of cells on prolonged operation and leakage of cells from the solid support. Furthermore, these technologies were not properly evaluated for their effect on sensory properties of the wine.

Several researchers have recognized the commercial prospects of conducting continuous deacidification of wine with high concentrations of non-growing, cells of *Leuc. oenos* that could be immobilized on a solid support and packed into a column (Davis et al. 1985b Am. J. Enol. Vitic 36: 290-301). Cuenat and Villettaz ((1984) Revise Suisse Vitic. Arboric Hortic 16: 145-151) immobilized a strain of *Leuc. oenos* on alginate and were able to completely remove malic acid in several wines of low and high $SO_2$ concentration in a continuous system. For example, two 2.5 L columns of immobilized cells connected in series were used to deacidify a Marsanne wine containing 11.3% ethanol and 139 mg/L total $SO_2$ at pH 3.3. Twenty five liters of wine were passed through the columns in 5.5 hr, after which the initial concentration of malic acid (6.1 g/L) was reduced to 0.07 g/L. Although immobilized cells may offer practical advantages in the deacidification of wines, such technology has not been commercially developed. The reasons for this are not clear but could relate to problems associated with microbial contamination of the reactors, transfer of flavor taints to the wine, loss of activity on prolonged operation and leakage of cells from the solid support. Furthermore, these technologies were not properly evaluated for their effect on the sensory properties of the wine (Davis et al. 1985b).

The present inventors have now surprisingly found that very high concentrations of free or immobilized lactic acid bacteria may be used to continuously achieve rapid conversion of malic acid to lactic acid without substantial adverse effect to the wine.

Further, surprisingly it has been found that the bacteria can remain biocatalitically active for an indefinite time, thus allowing the process of the invention to operate continuously, or with interruptions.

DISCLOSURE OF THE INVENTION

The present invention consists of a process for the controlled malolactic fermentation of wine comprising the steps of:
  a) passing wine containing malic acid through a bacteria retaining filter into a reaction vessel containing a culture of a bacterium or yeast capable of converting malic acid to lactic acid having a cell concentration of at least $10^8$ cfu/ml (colony forming units per ml).
  b) allowing the wine a residence time in the reaction vessel sufficient to enable the bacteria or yeast to convert at least a proportion of the malic acid in the wine to lactic acid; and
  c) withdrawing wine from the reaction vessel through a bacteria retaining filter.

As hereinafter defined the term wine is intended to include all fermented fruit juices. For example, the present invention can be applied to the production of white and red table wines, cider and perry.

In a preferred form of the invention the bacterial or yeast cells are immobilized on a support, such as a sheet of a suitable carrier material or beads. Immobilization of the cells increases the useful life of the cells as well as allowing a higher density of cells in the reaction vessel.

The process according to the present invention is preferably carried out on a continuous basis with the wine flowing continuously into the reaction vessel through a first filter and out of the reaction vessel through a second filter. The process could however be carried out as a batch process utilizing only a single filter.

Thus, the present invention exploits the biocatalytic properties of high cell concentrations of *Leuconostoc oenos* or other appropriate bacteria or yeast which are entrapped within the confines of a reaction vessel by use of bacteria retaining filters. The filter at the base of the reaction vessel permits exit of the wine but not the bacterial or yeast cells which are retained permanently in the reactor at their charge concentration which is preferably $10^9$–$10^{10}$ cfu/ml. As the wine passes through the reaction vessel malic acid is rapidly converted to lactic acid. By appropriate combination of cell density and wine flow-rate through the reactor it is possible to achieve the malolactic fermentation in a matter of minutes without detriment to wine quality. In addition, other reactions occur that enhance the complexity of wine flavor.

The reactor for use in a continuous process for the controlled malolactic fermentation of wine comprises:
  a) a reactor vessel;
  b) inlet means for introducing wine into the reaction vessel;
  c) a bacteria retaining filter to filter wine entering the reaction vessel through the inlet means;
  d) an outlet means for withdrawing wine from the reaction vessel;
  e) a bacteria retaining filter unit to filter wine being withdrawn from the reaction vessel through the outlet means; and
  f) the reaction vessel containing a cell suspension containing a concentration of a bacterium or yeast capable of converting malic to lactic acid containing at least $10^8$ cfu/ml.

In a preferred form the apparatus is designed to operate continuously with the wine flowing continuously into the reaction vessel through a first filter and out of the reaction vessel through a second filter. The apparatus could be designed however to suit a batch process utilizing only a single filter.

In a preferred form the reactor will comprise means for controlling the temperature of the wine within a temperature range that is optimal for the bacteria or yeast to convert malic acid to lactic acid.

Any type of bacteria retaining fluid filter would be suitable for the apparatus of the invention, as is well known in the field, such as for example fiber filters, membrane filters, cross flow membrane filters or hollow fiber filters or combinations thereof.

In a preferred form of the invention the second bacteria retaining filter is a cross flow membrane or hollow fiber membrane which is connected with the reaction vessel by a circulating pump and permits recirculation of the wine between the reaction vessel and the second filter unit.

DETAILED DESCRIPTION OF THE INVENTION

Figure 1:
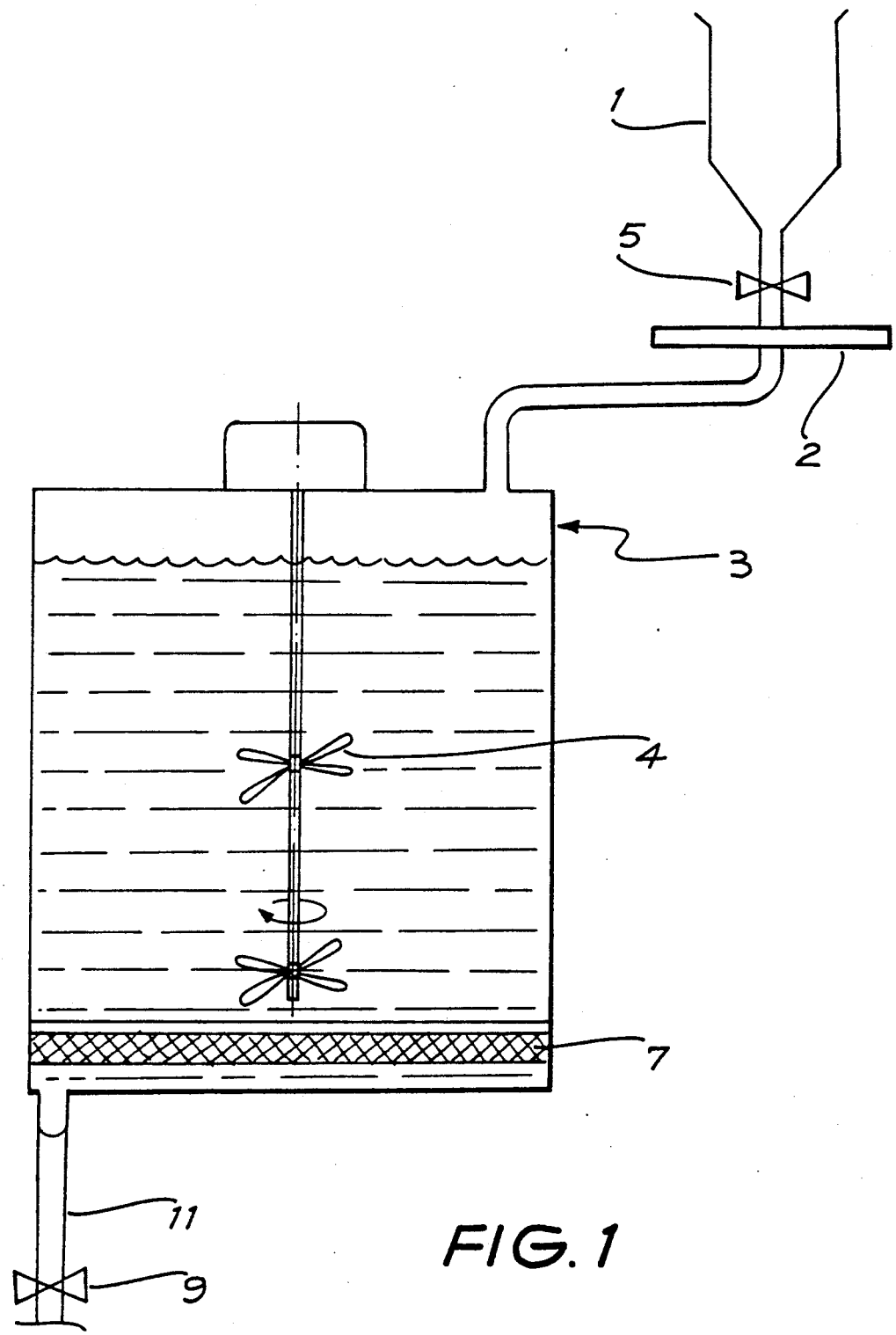
FIG. 1 shows a simple flow plan of the invention for the continuous controlled malolactic fermentation of wine in a stirred reaction vessel with a bacteria retaining filter on the inlet and outlet of the reaction vessel.
Figure 2:
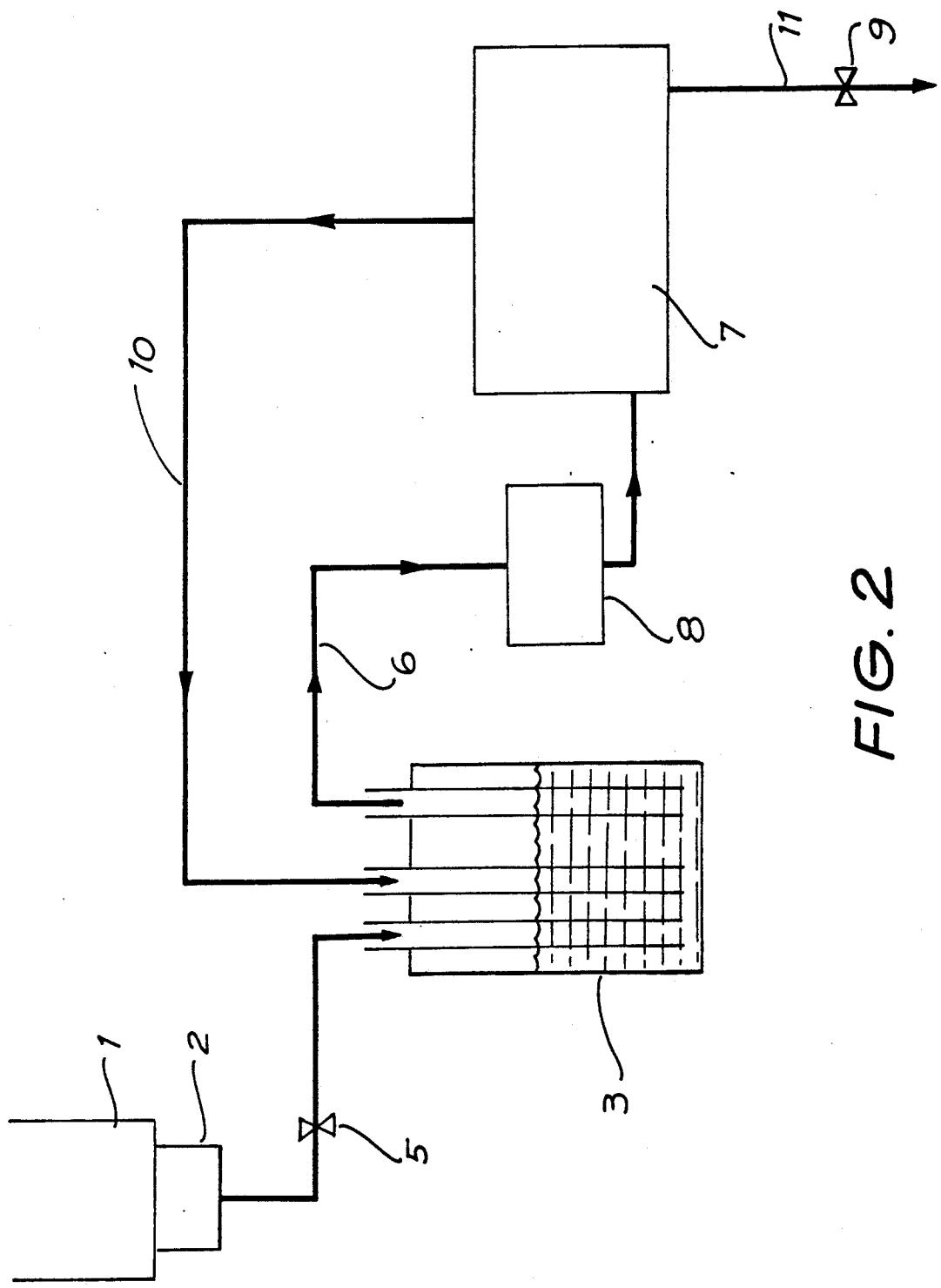
FIG. 2 shows a flow plan for continuously working the invention by circulating the wine in the reaction vessel through cross-flow or hollow-fiber membrane filters.

With reference to FIGS. 1 or 2, wine containing malic acid is stored in reservoir 1 and continuously flows through a first filter unit 2 into a reaction vessel 3 that is fitted with an optional stirrer-agitator 4. Reaction vessel 3 contains cells of a suitable bacterium or yeast capable of converting malic acid to lactic acid, preferably Leuconostoc oenos at a concentration of at least $10^8$ cfu/mL, said cells can be either free in solution within the reaction vessel or attached to a solid support. The solid support would preferably be thin sheets of a suitable material such as known in the field e.g. alginate, or maybe in the form of beads such as glass or gel. The flow rate of the wine into the reaction vessel 3 can be adjusted by inlet valve 5. Wine is continuously removed from the reactor vessel 3 through outlet means 6 which is connected in line to a second filtration unit 7. Wine with reduced acid passes through filtration unit 7 and leaves the system for further processing through pipe 11. Pumping means 8 may be optionally connected to transfer the wine from reaction vessel 3 to second filtration unit 7 along the outlet means 6. Outlet means 6 is preferably fitted with an outlet valve 9 which functions to regulate the rate of removal of wine from the reaction vessel 3. Together, inlet valve 5 and outlet valve 9 can be adjusted such that the inlet flow rate equals the outlet flow rate and also adjusted so that the residence time of the wine in the reaction vessel can be lengthened or shortened depending on the desired extent of the acid conversion reaction or for development of particular wine characteristics such as subtle changes in flavor complexity as well as a reduction in acidity.

Second filtration unit 7 can be any type of bacteria retaining fluid filter, the actual choice would be determined by the fluid volume and total system design, and preferably would be a membrane type filter such as a cross-flow membrane filter or a hollow fiber membrane filter, both types of filter requiring a pump 8 to maintain fluid pressure across the membrane. This particularly preferred choice of filter would require the wine to recirculate between the reaction vessel 3 and the second filter unit 7 by way of pipe connection 10 in FIG. 2.

The reaction vessel 3 could preferably be equipped with temperature controlling means in order to maintain the reaction vessel and its contents at the desired temperature range for the reaction, preferably 10°—25° C., more preferably less than 20° C.

The reaction vessel 3 could also be optionally equipped with means for introducing a gas free of oxygen, such as nitrogen, into the head space of the vessel in order to minimize oxidation of the wine.

The preferred bacterium species is Leuconostoc oenos. Certain species of Pediococcus and Lactobacillus may also be used to conduct the reaction. The preferred yeast for use in the invention is Schizosaccaromyces macedovorans. Leuconostoc oenos is the most favoured species by wine makers. During the growth period, many other wine constituents are metabolized by the bacteria and end products are generated. These secondary reactions enhance the complexity of wine flavor.

It has been found that a substantial advantage of the process according to this invention is that the bacterial culture may be maintained in a viable condition for some days and possibly larger if stored in a chilled or frozen condition. Such cells when stored at temperatures just above the freezing point of the culture, for instance 4° C., will survive for some time. Freezing the cells allows the cells to be reused at a later date. The temperature of the cells may be raised and the process continued immediately without adversely affecting the rate of the malolactic fermentations in the reaction.

It is preferred that the reactor is operated at a positive pressure of nitrogen or carbon dioxide gas so as to prevent oxidation of the wine.

Bacterial strains used in the following examples are available from the Australian Wine Research Institute.

Figure 3:
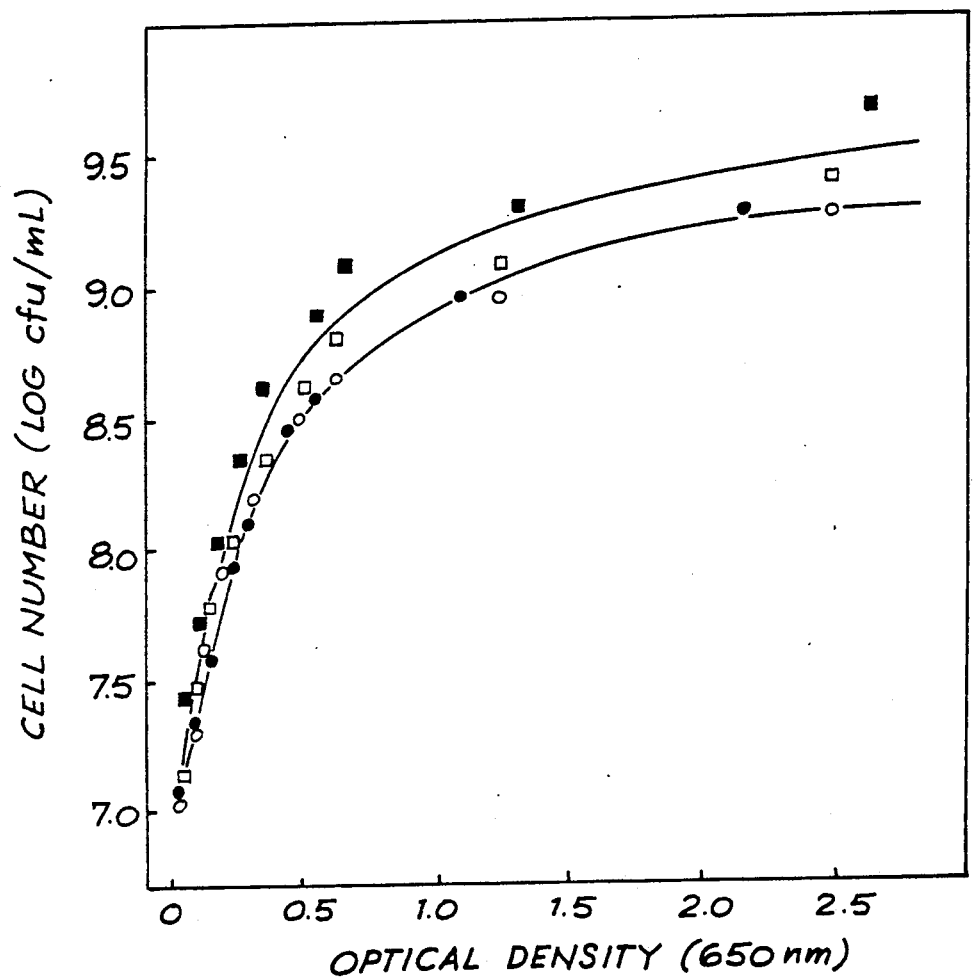
FIG. 3 is a plot of the standard curve of cell number ($\log_{10}$ cfu/mL) vs. optical density (650 nm) of cells of *Leuconostoc oenos* strains. The cells were diluted in phosphate-tartrate buffer (pH 3.5).

All the following experiments were performed using Leuc. oenos strain 2.1 which is a representative of morphotype 4. For each experiment, cells were prepared by preculture for 5 days at 30° C. in MRST medium. This 10 mL culture was used to inoculate a 250 mL culture in the same medium. Cells for malic acid degradation were obtained from this second culture at the late exponential phase of growth (generally after 3 days at 30° C.). The cells were sedimented by centrifugation at 3000 rpm for 15 min and resuspended in grape juice or wine, as indicated in the text, to obtain a cell concentration of approximately $1 \times 10^{10}$ cfu/mL. The concentration was adjusted according to the standard curve of FIG. 3. All steps were conducted under aseptic conditions.

The vinification properties of grape juice and wines used in malic acid degradation experiments 1 and 2 are shown in Table 1. The juice and wines were sterilized by filtration through a 0.45 um membrane and stored at 4° C. prior to use.

TABLE 1

Chemical composition of Rhine Riesling grape juice, Chardonnay wine and Chablis wine used in acid degradation studies.

| Property | Rhine Riesling juice[a] | Chardonnay wine[a] | Chablis wine[b] |
|---|---|---|---|
| Free SO$_2$ (mg/L) | 0 | 0 | 20 |
| Total SO$_2$ (mg/L) | 3 | 53 | 95 |
| pH | 3.02 | 3.45 | 3.18 |
| Titratable acidity (g/L) | 11.4 | 8.6 | 7.4 |
| Sugar (g/L) | 200 | 2.0 | 2.6 |
| Alcohol (% v/v) | 0 | 11.5 | 12.4 |
| Malic acid (g/L) | 2.45 | 3.2 | 2.02 |

[a]From 1987 vintage; taken from bulk storage in stainless steel tanks; the wine was taken 5 days after the completion of alcoholic fermentation and had not undergone malolactic fermentation.
[b]From 1986 vintage; bottled wine that had not undergone malolactic fermentation.

Chemical analyses of samples in all following experiments we conducted as follows:

Organic acids: The concentrations of L-malic, citric, acetic and L-Lactic acids were determined enzymatically using the kit reagents of Boehringer Mannheim (Anon 1980).

Other analyses: Properties of pH, and concentrations of $SO_2$, titratable acidity, sugar and alcohol were determined using standard methods.

EXAMPLE 1

Laboratory scale experiments using a reactor similar to FIG. 1 charged with a 25.0 mL suspension of *Leuconostoc oenos* at $10^9$-$10^{10}$ cells/mL and a wine flow rate of 2.0 mL/minute through the reactor have yielded the following results:
- Complete degradation of malic acid in a Chardonnay wine. Wine entering the reactor had a malic acid concentration of 3.2 g/L; wine exiting from the reactor contained no detectable malic acid.
- The reactor operated continuously over a total period of 17 hours giving the same complete degradation of malic acid; testing was discontinued after this time.
- The reactor cells were stored at 4° C. for 4 days without loss of malic acid degrading ability; longer storage times appear very feasible.
- Taste testing showing that wine exiting from the rector had no adverse character and exhibited the desirable characters of a wine that had undergone a normal malolactic fermentation. These characteristics included the subtle changes in flavor complexity as well as reduction in acidity.

These results are extremely positive and indicate the technical feasibility of conducting continuous, rapid malolactic fermentation of white wine on a large scale.

Apart from offering the advantage of an almost instantaneous, clean, malolactic fermentation, the membrane bioreactor technology also provides for:
- Control over the "completeness" of the malolactic fermentation; by adjusting the flow rate of wine through the reactor it will be possible to generate wine with different levels (e.g. 90%, 50%, etc.) of malic acid degradation. This degree of control could prove extremely useful in "balancing" the sensory properties of the wine.
- Further control of the sensory quality of the wine by use of different strains of *Leuconostoc oenos* or other species in the reactor. It may be possible, even, to use certain strains of yeasts in the reactor.

EXAMPLE 2

DEGRADATION OF MALIC ACID IN SUCCESSIVE BATCHES OF GRAPE JUICE OR WINE

Figure 4:
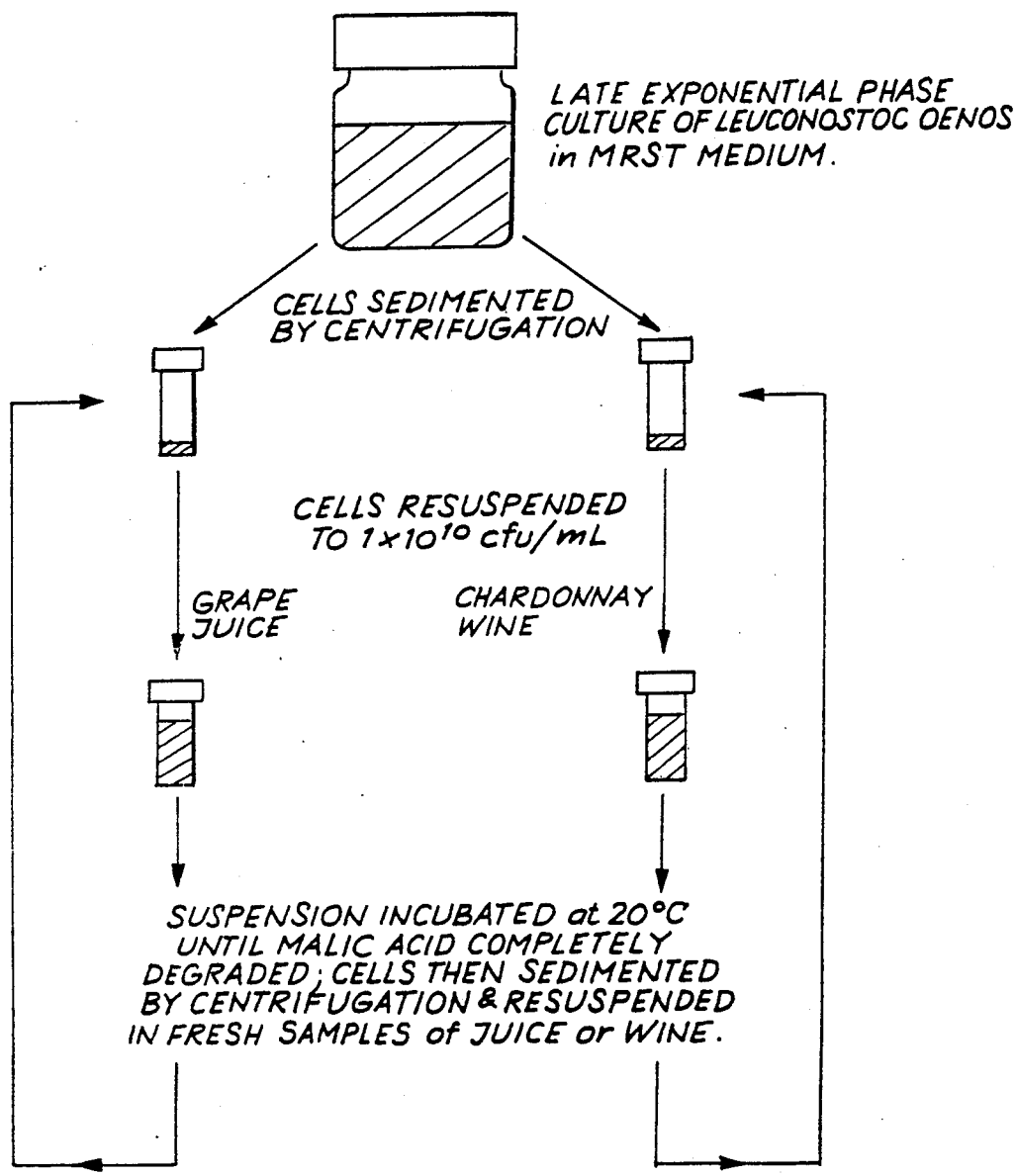
FIG. 4 is a flow chart illustrating the repeated use of *Leuconostoc oenos* cells for degradation of malic acid in grape juice and white wine.

Freshly harvested cells of *Leuc. oenos* 2.1 were suspended in duplicate volumes (2.0 mL) of either grape juice or Chardonnay wine to give a suspension of $1 \times 10^{10}$ cfu/mL. The suspension was incubated at 20° C., and at 0, 5 and 15 min intervals, samples were examined for the concentration of L-malic acid. When malic acid had been degraded completely, the suspensions were centrifuged (3000 rpm for 15 min) and the sedimented cells resuspended in another 2.0 mL batch of juice/wine. The new suspensions were incubated at 20° C. and the concentration of malic acid was again monitored as a function of time. The procedure was repeated 5 times. A flow chart of the procedure is presented in FIG. 4.

Figure 6:
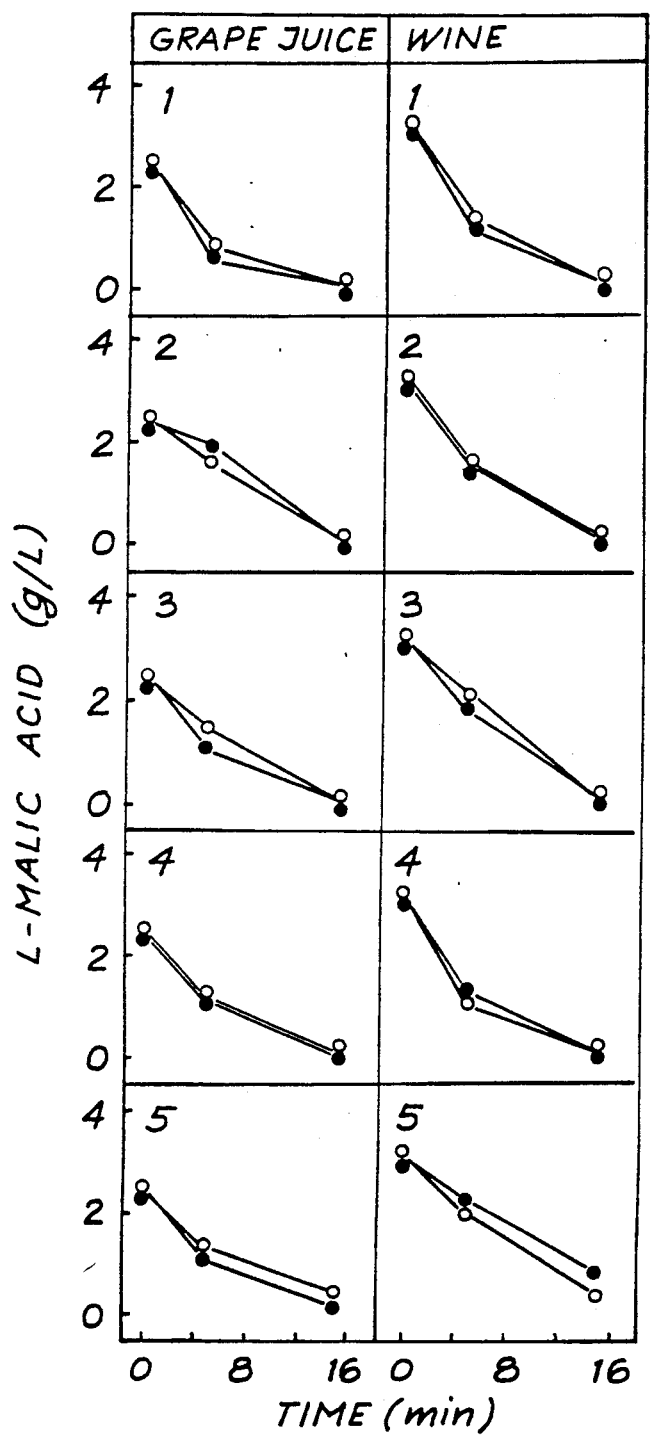
FIG. 6 shows degradation of malic acid in batch samples of Rhine Riesling grape juice and Chardonnay wine using $1 \times 10^{10}$ cfu/mL of *Leuconostoc oenos* strain 2.1. After the completion of each trial (after 15 min), cells of *Leuconostoc oenos* were harvested by centrifugation and resuspended in fresh juice or wine to conduct the reaction in the next trial. This process was repeated in succession to give the numbers in the subfigures. The point (○) and (●) represent the data of duplicate experiments.

FIG. 6 shows the reduction in concentration of malic acid during batch incubation of grape juice or wine with high concentrations of cells of *Leuc. oenos* 2.1. The same cells could be sedimented and reused to conduct a further 5 reactions without appreciable effect on the rate at which malic acid was degraded. The concentration of malic acid was reduced from 2-3 g/L to less than 0.1 g/L in 15 min. A slight reduction in the rate of malic acid degradation was noted only in the fifth incubation.

DEGRADATION OF MALIC ACID IN WINE BY A CONTINUOUS PROCESS

Figure 5:
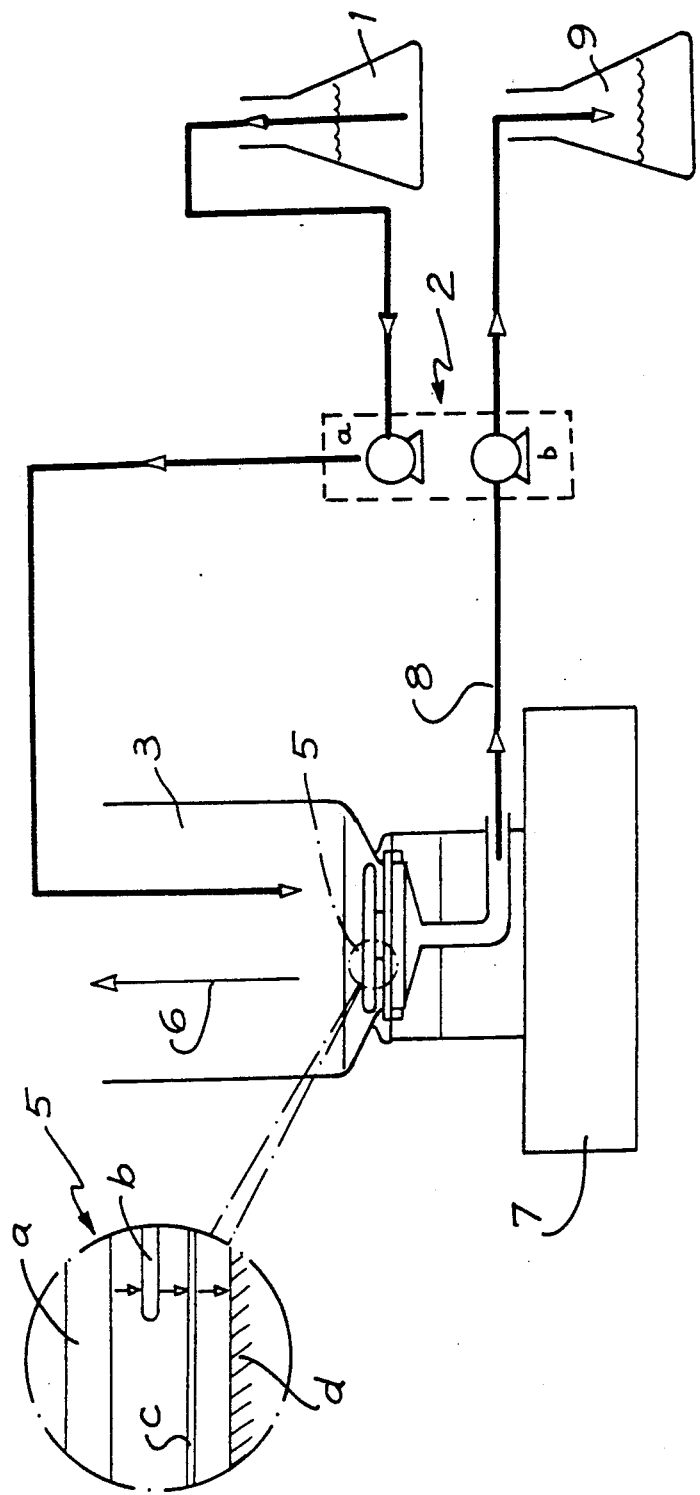
FIG. 5 is a schematic layout of laboratory apparatus used to conduct continuous malic acid degradation in wine as described in example 2: (1) filtered wine feed reservoir, (2) multichannel peristaltic pump: a, channel pumping feed wine at 2 mL/min into reactor, b, separate channel pumping wine out of reactor at 2 mL/min, (3) reactor vessel (250 mL Millipore filter housing), (5) exploded view of filter and stirring bar arrangement: a, magnetic stirring bar; b, 13 mm prefilter pad; c, 0.45 um membrane filter; d, filter support screen, (6) $CO_2$ gas evolved from reactor, (7) magnetic stirrer table, (8) wine flow out of reactor, (9) wine product reservoir.

A flow chart of the system used to conduct continuous degradation of malic acid in wine is shown in FIG. 5. The reactor unit 3 consisted of a 250 mL Millipore filter housing (Sterifil holder No. XX11 04710) fitted with a 47 mm 0.45 um membrane filter. A 13 mm pad prefilter was centrally placed on top of the 0.45 um membrane filter and 10 mL of Chardonnay wine was dispensed and drained through the unit to facilitate adherence of the pad to the membrane filter. A 37 mm plastic coated stirring bar was located on the prefilter. The pad prefilter acted as a support for the stirring bar and separated it from the surface of the membrane. The reactor unit was clamped in place over the magnetic stirrer 7 and connected to the pump apparatus 2 as shown in FIG. 5. Freshly harvested cells of *Leuc. oenos* strain 2.1 were suspended to a concentration of $1 \times 10^{10}$ cfu/mL in 25 mL of Chardonnay wine and dispensed into the reactor unit 3. With the magnetic stirrer 7 activated and filtrate outlet clamped, the cell suspension was incubated at 20° C. for 15 min to equilibrate the cells to the wine environment. The stirrer in the filtration cell had two main function: (1) it maintained a homogeneous suspension of the wine and bacterial cells, and (2) it prevented bacterial cells from building up and fouling the membrane surface.

After the cells were equilibrated, Chardonnay wine was simultaneously fed into and filtered out of the reactor unit at a rate of 2.0 mL/min to initiate the continuous reaction. Pumping operations were carried out using two separate channels of a central peristaltic pump unit (Technicon multichannel, model DPC8171); one channel pumped wine from a feed reservoir into the reactor unit via tube 6 and the other channel drew wine through tube 8 from the downstream outlet of the unit to a product reservoir. The continuous process was carried out at 20° C. Carbon dioxide was continuously flushed into the headspaces of both reactant and product reservoirs to help prevent wine oxidation. The extent of malic acid degradation was monitored during the process by measuring the concentration of malic acid in wine samples (1 mL) taken, in-line, from the downstream side of the reactor unit. The reaction process was operated continuously for a period of approximately 9 hr. The integrity of the 13 mm pad prefilter was checked for wear during the reaction and replaced when necessary with a new filter pad. After completion of the first continuous degradation experiment, the wine was drained from the vessel and the cells of *Leuc. oenos* were resuspended in 20 mL of fresh wine and stored at 4° C. in a 25 mL screw-capped McCartney bottle for 48 hr. After this time, the suspension was returned to the reactor and operated as described previously on a continuous basis with fresh Chardonnay wine for approximately 4 hr. At the end of this experiment, the cells were again stored at 4° C. for 24 hr and then used in the same way for a third continuous reaction process with Chardonnay wine for approximately 4 hr.

Continuous degradation of malic acid with the 1986 Chablis wine was conducted as described above using freshly prepared cells of *Leuconostoc oenos* strain 2.1.

The degradation of malic acid was monitored for approximately 3 hr of the reaction process by periodic measurement of malic acid in wine collected after passing through the reactor.

The concentrations of malic, lactice, citric and acetic acids, and also pH were determined in unreacted and product wines from each experiment. After passage through the reactor, the wines were adjusted in $SO_2$ concentration to approximately 25 mg/L free $SO_2$ and stored in airtight glass containers at 4° C. to prevent oxidation. These wines were taken from storage after 2 days and evaluated for sensory properties by a panel of four experienced winetasters, one whom was awarded the title of "Winemaker of the Year" at the Bristol International Wine Show in 1986.

Results

The following results were obtained from this experiment.

Chardonnay wine

Figure 7:
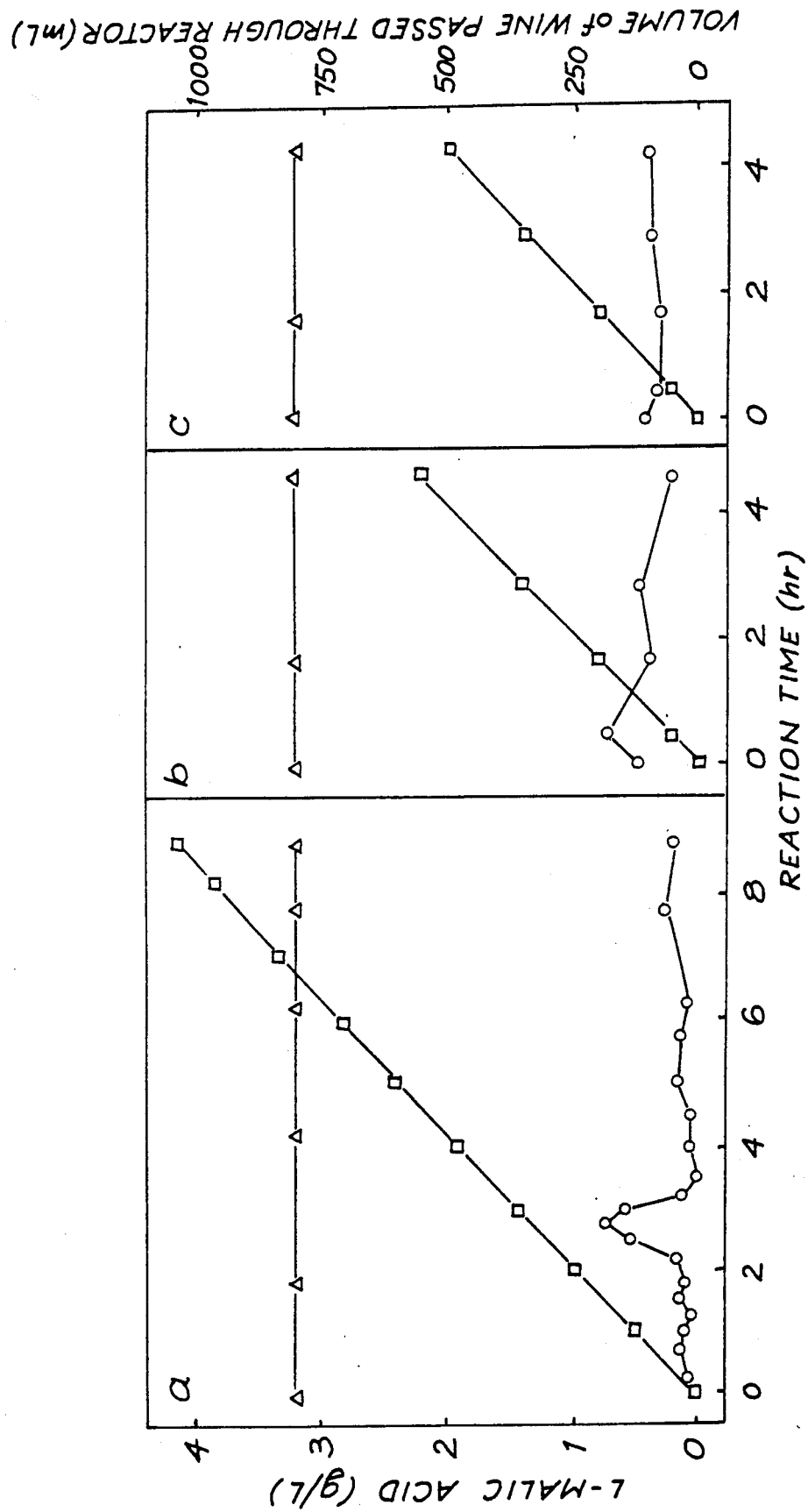
FIG. 7 shows the degradation of malic acid in Chardonnay wine passed continuously through a membrane reactor charged with cells of *Leuconostoc oenos* strain 2.1. The flow rate of wine into and out of the reactor was 2 mL/min. The reactor was maintained at a volume of 25 mL containing $1 \times 10^{10}$ cfu/mL of *Leuconostoc oenos*. Plot (a) is first reaction, plot (b) is second reaction using cells from (a) after storage at 4° C. for 48 hours, and plot (c) is third reaction using cells from (b) after storage at 4° C. for 24 hours. △—△— represents concentration of malic acid in wine entering the reaction vessel; ○—○— represents the concentration of malic acid in wine leaving the reaction vessel; □—□— represents the approximate volume of wine passed through the reaction vessel.

FIG. 7 shows the degradation of malic acid in Chardonnay wine on continuous passage through the membrane reactor. Table 2 gives the pH and concentrations of malic, lactic, citric and acetic acids in the wine before and after continuous reaction. Malic acid in the Chardonnay wine was virtually completely degraded under the condition of the first process (FIG. 7a). The concentration of malic acid in the wine entering the reactor was 3.22 g/L while that in samples of wine leaving the reactor was approximately 0.2 g/L. The overall rate at which malic acid was degraded during the first reaction was 0.36 g/hr. The slight reduction in this rate observed in the 2-3 hr samples was due to a gradual build up of cells which fouled the membrane. This was rectified by increasing the speed of the rotating stirring bar. After 9 hr, this first reaction was stopped and the cells of *Leuc. oenos* were stored at 4° C. for 48 hr. Reuse of these cells in a second reaction (FIG. 7b) gave a slightly slower rate of malic acid degradation of 0.34 g/hr. A further storage and reuse of these cells (FIG. 7c) also yielded a rate of malic acid degradation of 0.34 g/hr. The molar concentration of malic acid degraded in Chardonnay wine during the continuous process was stoichiometrically equivalent to the concentration of lactic acid produced, i.e. the average molar ratio of malic acid degraded versus lactic acid produced was approximately 1.00, ranging between 0.96–1.08. The pH of the wine increased by 0.09 pH units after the first reaction and by 0.07 pH units after the second and third reaction (Table 2). The concentration of citric acid was reduced by an average of 0.24 g/L after reaction and the concentration of acetic acid increased by an average of 0.39g/L (Table 2).

TABLE 2

Concentrations of organic acids and pH of Chardonnay and Chablis wines before and after continuous passage through a membrane reactor charged with cells of *Leuconostoc oenos* strain 2.1.

| Wine | pH | Malic acid (g/L) | Lactic acid (g/L) | Citric (g/L) | Acetic acid (g/L) |
|---|---|---|---|---|---|
| Chardonnay | | | | | |
| Unreacted wine | 3.45 | 3.22 | 0.07 | 0.34 | 0.18 |
| After 1st reaction passage (FIG. 7a)[a] | 3.54 | 0.19 | 1.96 | 0.10 | 0.57 |
| After 2nd reaction passage (FIG. 7b)[a] | 3.52 | 0.46 | 2.01 | 0.11 | 0.54 |
| After 3rd reaction passage (FIG. 7c)[a] | 3.52 | 0.36 | 2.06 | 0.10 | 0.60 |
| Chablis | | | | | |
| Unreacted wine | 3.18 | 2.02 | 0.17 | 0.25 | 0.66 |
| After reaction passage[a] | 3.19 | 1.45 | 0.55 | 0.24 | 0.70 |

[a]Sample was taken from the total amount of wine accumulated after passage through the reactor unit Sensory evaluation of Chardonnay wine samples taken after passage through the reactor revealed them to have all the desirable characteristics of a wine that had undergone a conventional MLF (Table 3). No undesirable sensory characters were noted in samples of wine taken after either of the reactions shown in FIGS. 7a, b and c.

Chablis Wine

Figure 8:
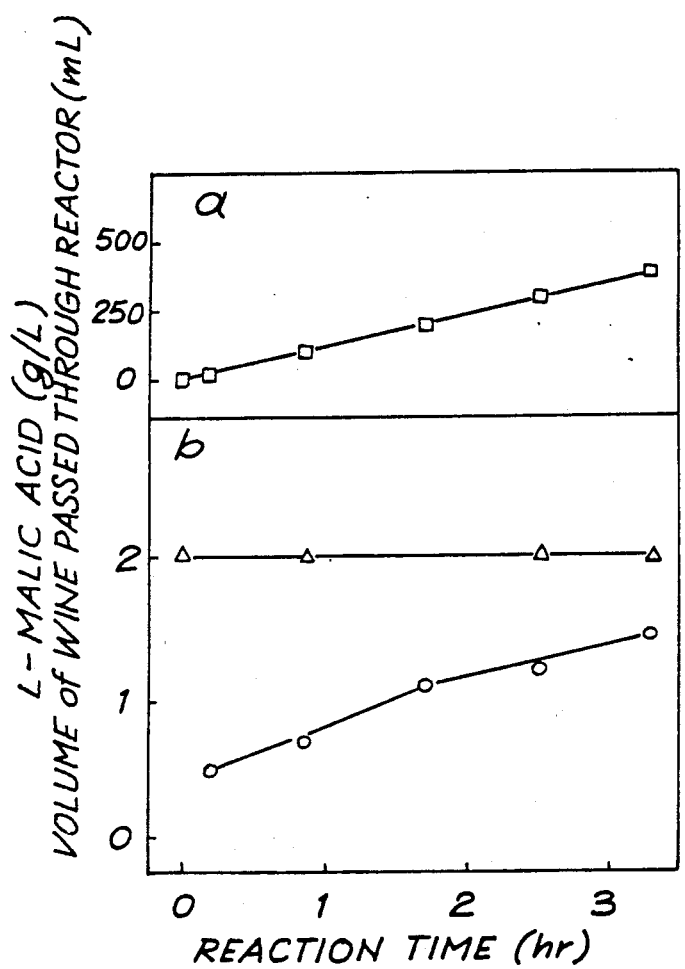
FIG. 8 represents the degradation of malic acid in Chablis wine passed continuously through a membrane reactor charged with cells of Leuconostoc oenos strain 2.1. The flow rate of wine into and out of the reaction vessel was 2 mL/min. The reaction vessel was maintained at a volume of 25 mL containing $1 \times 10^{10}$ cfu/mL of Leuconostoc oenos. △—△— represents concentration of malic acid in wine entering the reaction vessel; ○—○— represents the concentration of malic acid in the cumulative volume of wine collected after passing through the reaction vessel.

The degradation of malic acid in the Chablis wine after continuous passage through the membrane reactor is shown in FIG. 8. Although there was greater than 50% reduction in the concentration of malic acid during the first hour of operation, the reactivity was not maintained and by 3 hr malic acid was degraded by only 34%. In the overall process with Chablis wine, the molar ratio of malic acid degraded was stoichiometrically equivalent to the concentration of lactic acid produced i.e. molar ratio of malic acid degraded versus lactic acid produced was 1.02. The pH of the wine after the reaction did not change significantly (Table 2). The concentration of citric acid was reduced by 0.01 g/L after reaction and the concentration of acetic acid increased by 0.04 g/L (Table 2). Sensory evaluation of the wine after passage through the reactor revealed that it had developed the desirable character of a wine that had undergone MLF and that no undersirable sensory characters were detectable (Table 3).

TABLE 3

Sensory characteristics of wines after degradation of malic acid by continuous passage through a membrane reactor charged with cells of *Leuconostoc oenos* strain 2.1.
Summary of tasting panel comments[a]

| Wine | Aroma | Flavor |
|---|---|---|
| 1987 Chardonnay | Slightly dulled fruit aroma. Added MLF complexity with typical buttery/citrus characters. Slightly increased volatility. No off aromas. | Wines smoother and more mellowed on the palate with greater mouth-feel and fullness. Flavor more complex with lingering MLF characters. No off-flavors. |
| 1986 bottled Chablis | Slightly dulled fruit aroma. Enhanced MLF complexity. No off-aromas. | Very smooth and more mellowed palate. Subtle MLF complexity; buttery/citrus. No off-flavors. |

[a]Comments in comparison with the same wine before passage through the reactor.

EXAMPLE 3

This experiment utilizes a reactor/filtration system as shown in FIG. 2.

The filtration unit was of a cross-flow membrane design, containing membrane sheets with pore size of 0.45 um. The wine was a commercially prepared claret which had the following relevant properties: pH 3.31%, ethanol 11.4%; sulphur dioxide 40 ppm total; malic acid 1.0 g/L.

The reactor vessel was maintained at a constant volume at approximately 300 mL and was charged with approximately $10^{12}$ cells of Leuconostoc oenos. Wine flow rate through the reactor and filtration unit was 5.0 mL per minute. The reactor was operated continuously for approximately 8 hours each day, refrigerated at 5° C. overnight, and reused the subsequent day. Temperature of the reactor during operation was maintained at 20° C. The reactor containing the one charge of cells of Leuconostoc oenos was used for seven subsequent days before the experiment was terminated. The cells of Leuconostoc oenos-retained excellent ability to degrade malic acid in wine following continuous operation for seven days. Significant degradation of malic acid in the wine occurred within the reactor as detailed in Table 4.

TABLE 4

| MALIC ACID IN WINE (g/L) | DAY | | | | | |
|---|---|---|---|---|---|---|
| | 1 | 2 | 3 | 4 | 6 | 7 |
| Before Reactor | 1.0 | 1.0 | 1.0 | 1.0 | 1.0 | 1.0 |
| After Reactor | 0.02 | 0.02 | 0.04 | 0.04 | 0.07 | 0.04 |

EXAMPLE 4

The experiment was the same as that described in experiment 3, except that the filtration unit was equipped with a hollow fiber membrane instead of a cross flow membrane filter, pore size 0.1 um. Flow rate through the system was approximately 3.5 mL/minute.

Table 5 demonstrates the degradation of malic acid in the wine as it passes through the reactor.

TABLE 5

| MALIC ACID IN WINE (g/L) | DAY | | | | |
|---|---|---|---|---|---|
| | 1 | 2 | 3 | 4 | 6 |
| Before Reactor | 1.0 | 1.0 | 1.0 | 1.0 | 1.0 |
| After Reactor | 0.04 | 0.06 | 0.11 | 0.23 | 0.71 |

The data demonstrated the feasibility of using hollow fiber membrane systems in the reactor design. The decreased stability of the cells of Leuconostoc oenos in this reaction system (after day 3) was most likely due to the fact that a different strain of Leuconostoc oenos was used in the reactor vessel rather than due to use of a different membrane type.

Discussion

The Examples demonstrate that the same biomass of Leuc. oenos could be repeatedly used to degrade malic acid in successive batches of Rhine Riesling grape juice and Chardonnay wine. Interestingly, similar rates of malic acid degradation were achieved by Leuc. oenos 2.1, inoculation into either Rhine Riesling grape juice or Chardonnay wine (FIG. 6), which suggests that this method of rapid malic acid degradation could be effectively utilized during commercial vinification either before or after the alcoholic fermentation. Moreover, these data suggested the possibility of using the same biomass of Leuc. oenos for the degradation of malic acid in white wine on a continuous basis. It has been recognized that the processing advantages of conducting the MLF on a continuous basis rather than by batch inoculation, yet such processes have not been successfully developed for commercial application.

Our studies have demonstrated that the disadvantages of using immobilized cells for the continuous degradation of malic acid in wine according to the prior art could be overcome through the use of a membrane bioreactor. The small-scale reactor used in this study, charged with a 25 mL suspension of $10^{10}$ cfu/mL of Leuc. oenos 2.1, enabled the continuous, rapid and virtually complete degradation of malic acid in approximately 2 L of Chardonnay wine. Further, it was shown that there was no loss of malic acid degrading ability by reactor cells after storage at 4° C. for 3 days. Problems of contamination of the reactor with unwanted microorganisms were not encountered because the wine fed into the reactor was filter sterilized. Such a requirement is not a problem to the wine industry where membrane filtration of wines—especially white wines—is commonly practised.

Sensory evaluation showed that the wine exiting from the reactor had no adverse character and exhibited the desirable characters of a wine that had undergone normal MLF. These characteristics included the subtle changes in flavor complexity as well as reduction in acidity. These results are extremely positive and indicate the technical feasibility of conducting continuous, rapid MLF of white wine on a commercial scale. Based on the current data, a membrane bioreactor of 50 L capacity charged with $10^{10}$ cfu/mL of Leuc. oenos would be capable of processing 7,500 L of wine per day.

Our experiments have demonstrated that effective operation of the membrane bioreactor is influenced by the particular wine being processed. This was evident when Chablis wine was passed through the reactor system, which resulted in a reduction of only 40% of its total concentration of malic acid (FIG. 8). The high concentration of free and total $SO_2$ present in this wine (respectively 20 and 95 mg/L; Table 1) most probably caused this reduced activity. Nevertheless, the Chablis wine exiting from the reactor still exhibited sensory characteristics of a wine that had undergone a conventional MLF (Table 3).

We claim:

1. A process for the controlled malolactic fermentation of wine containing malic acid, comprising the steps of:
    a) filtering the wine through a first filter, wherein the first filter is extended across an inlet of a reaction vessel and substantially prevents passage of bacteria into the reaction vessel;
    b) passing the filtered wine of step a) through the inlet into the reaction vessel containing a culture having a cell concentration of at least $10^8$ cfu/ml selected from the group consisting of bacteria and yeast which is capable of converting malic acid to lactic acid, wherein the culture is a free suspension of cells or immobilized onto the surface of a solid carrier within the reaction vessel;
    c) holding the wine in the reaction vessel for a sufficient residence time to enable the culture to convert a proportion of the malic acid in the wine to lactic acid;
    d) withdrawing the wine from the reaction vessel through an outlet of the reaction vessel; and
    e) filtering the withdrawn wine of step d) through a second filter, wherein the second filter is extended across the outlet of the reaction vessel and is capable of preventing the passage of the culture out of the reaction vessel.

2. The process of claim 1, further comprising the step of agitating the culture in the reaction vessel.

3. The process of claim 1, wherein the wine passes continuously into the reaction vessel through the first filter and out of the reaction vessel through the second filter.

4. The process of claim 1, wherein the wine is fermented juice of grapes.

5. The process of claim 1, wherein the cell concentration is at least $10^{10}$ cfu/ml.

6. The process of claim 1, wherein the first filter is selected from the group consisting of membrane, ultra, depth and fiber filters.

7. The process of claim 1, wherein the second filter is selected from the group consisting of membrane, ultra, depth, fiber, cross-flow membrane and hollow-fiber filters.

8. The process of claim 1, wherein the flow rate of the wine through the reactor vessel is adjusted to influence the flavor of the wine.

9. The process of claim 1, wherein the bacteria is a culture of *Leuconostoc oenos*.

10. The process of claim 1, wherein the reaction vessel is operated under an atmosphere that is essentially free of oxygen.

11. The process of claim 1, wherein the temperature of the wine within the reaction vessel is in the range of 10°–25° C.

12. The process of claim 3, wherein the second filter is a cross-flow membrane filter.

13. The process of claim 3, wherein the second filter is a hollow-fiber membrane filter.

* * * * *